United States Patent
Saxton

(10) Patent No.: US 6,862,918 B2
(45) Date of Patent: Mar. 8, 2005

(54) DEVICE FOR TESTING DOMESTIC WATER PIPING SYSTEMS AND METHODOLOGY

(76) Inventor: Wesley Saxton, 15152 U.S. Hwy. 190 West #9, P.O. Box 130, Onalaska, TX (US) 77360

( * ) Notice: Subject to any disclaimer, the term of this patent is extended or adjusted under 35 U.S.C. 154(b) by 0 days.

(21) Appl. No.: 10/460,726

(22) Filed: Jun. 12, 2003

(65) Prior Publication Data

US 2003/0230148 A1 Dec. 18, 2003

Related U.S. Application Data

(60) Provisional application No. 60/389,687, filed on Jun. 18, 2002.

(51) Int. Cl.[7] .............................................. G01M 3/08
(52) U.S. Cl. ................................................... 73/40.5 R
(58) Field of Search .............................. 73/40, 40.5 R, 73/40.7, 49.1, 756

(56) References Cited

U.S. PATENT DOCUMENTS

| | | | | |
|---|---|---|---|---|
| 4,599,890 A | * | 7/1986 | Girone et al. .................. | 73/37 |
| 5,448,907 A | * | 9/1995 | Jensen et al. .................. | 73/38 |
| 5,786,538 A | * | 7/1998 | Barone ......................... | 73/714 |
| 5,992,438 A | * | 11/1999 | Shaw ........................... | 137/14 |
| 6,032,537 A | * | 3/2000 | McLaren ....................... | 73/756 |

* cited by examiner

Primary Examiner—Robert Raevis
(74) Attorney, Agent, or Firm—Michelle Evans; Gunn & Lee, P.C.

(57) ABSTRACT

An apparatus for testing domestic water piping systems and a method for testing such systems from a washing machine box. The apparatus has a body and a set of flexible detachable hoses. The body has a central elongated member. At the top most portion of the central elongated member is an IPS connection. This IPS connection connects to a 100 PSI gauge. At opposing sides of the uppermost portion of the central elongated member are second IPS connections. Connected to these IPS connections is a compression 90° elbow. At the other end of the compression 90° elbow is a third IPS connection. On the left section of the lowermost portion of the central elongated member is a female garden hose fitting. On the right side of the lowermost portion of the central elongated member is a pressure bleed valve (shrader valve) controlled by a control knob at its base. Two flexible detachable hoses are provided each having a female hose connection at one end and a nut at the remaining end. The nut is for attachment to the third ISP connections and the female hose connection is for attachment to the washing machine box hot and cold valves.

8 Claims, 3 Drawing Sheets

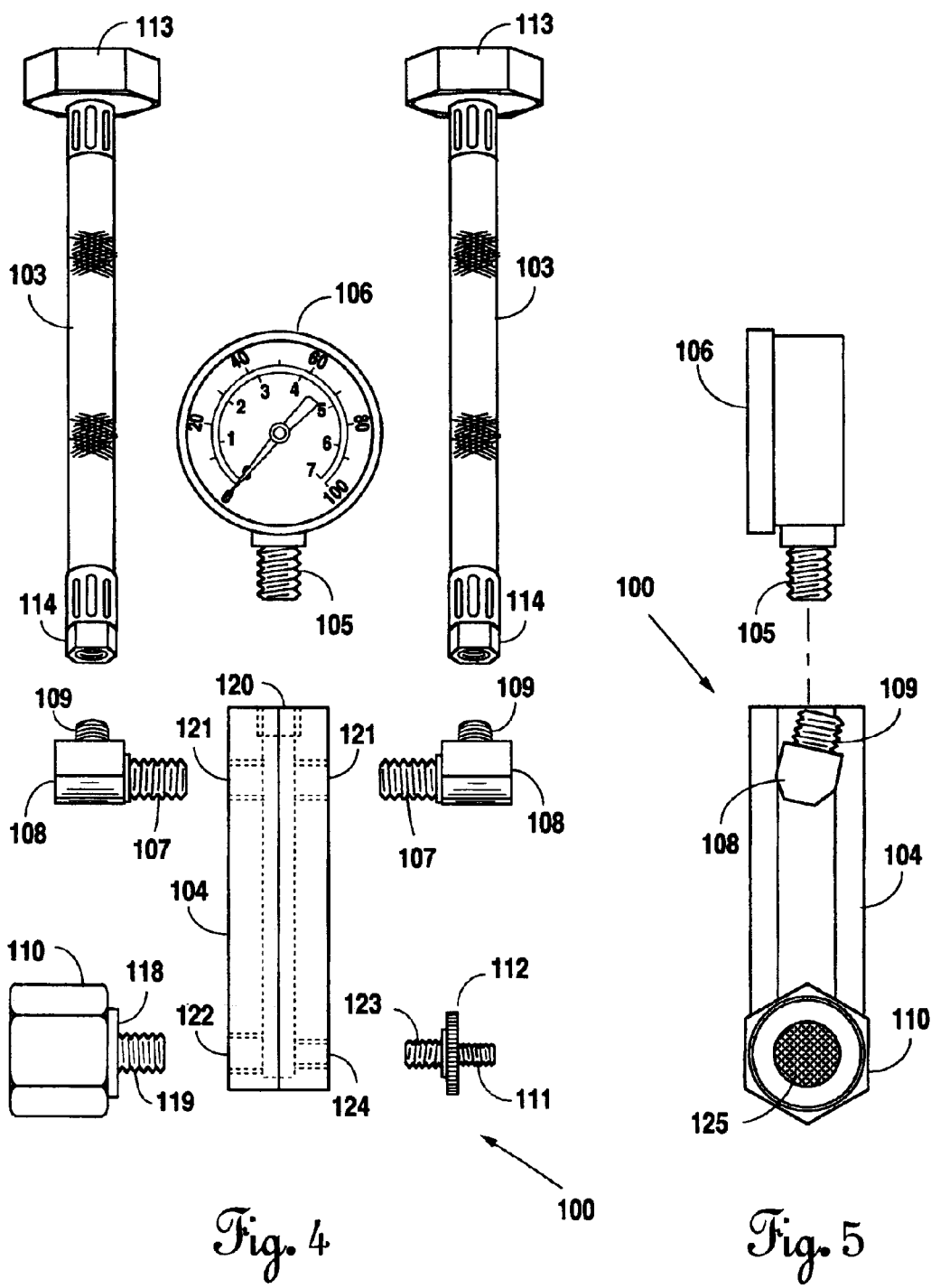

DEVICE FOR TESTING DOMESTIC WATER PIPING SYSTEMS AND METHODOLOGY

This application claims priority to U.S. Provisional Application No. 60/389,687 filed Jun. 18, 2002.

BACKGROUND OF THE INVENTION

1. Field of the Invention

Applicant's invention relates to an apparatus for testing domestic water piping systems in commercial and residential construction and a method of testing such systems by way of a washing machine box. This apparatus and methodology substantially improve the current method by which plumbing contractors test water piping systems for leaks from one universal location.

2. Background Information

Plumbing in both residential and commercial construction consists essentially of three key components. The supply system carries the water from under ground water mains, a storage tank or a well into the building and around to the fixtures such as the sinks, showers, and toilets and to appliances such as a dishwasher and washing machine. The main shut off is typically around the property line at the water meter. All fixtures typically have their own isolated shut off valve so the whole house won't be without water just to repair certain fixtures. The second key component of the plumbing system is the drain. The waste system carries used water and waste out of the building into a sewer or septic tank. All piping is sloped downhill at typically a ¼ inch per foot. Cleanouts can be placed in the lines for the convenience of running a sewer snake into the line if the line becomes plugged. The last part of the plumbing system is the vents. The vent system carries away any sewer gases and maintains atmospheric pressure inside the drain pipes, preventing deadly gases from entering the home.

After the framing stage of a construction project and prior to closing the stud walls with some type of wall board, a plumbing contractor will initially install the water lines for showers, baths, sinks, and toilets. The water piping system joints are joined by various methods, depending on the type of materials used. According to code, all concealed piping must be tested until no leaks are found and inspected before any additional construction can continue on the building project.

Unfortunately, the current methods available to test the water piping system include the use of two or more different gauges installed throughout the construction site at fixed outlet termination locations. Typically the plumbing contractor has to solder two lines together at a common fixture, affix an apparatus to apply air to the system for the code required test. Gauges of this type are only effective if the plumbing contractor physically ties the hot and cold water lines together at termination outlets using materials consistent with the piping. A major disadvantage of the current method is the inconvenience of gauge placement for the plumbing contractor. This process is inherently time consuming. In addition, the placement of various gauges throughout the building hinders other trades, such as the cabinetry tradesman and sheetrock wallboard trade. Further, project completion dates can be substantially postponed due to complications caused by this current multiple gauge testing procedure.

The present invention substantially improves the present method because it only involves one gauge and one location. This gauge fits over existing washing machine box outlet spigots and is mostly concealed within the confines of this box. The use of this one gauge is more convenient than the multi-outlet placement of gauges and allows for other trades to complete their work without impeding the progress of the project. The ability to place this gauge at the washing machine box also makes it easier for an inspector performing the inspection of the water lines.

SUMMARY OF THE INVENTION

It is an object of the present invention to provide a novel apparatus for testing domestic water piping systems and method of testing such systems by way of a washing machine box. The apparatus has two primary components, a body and a set of flexible detachable hoses. The body has a central elongated member. At the top most portion of the central elongated member is a first internal pipe swivel (IPS) connection. This IPS connection connects to a 100 PSI gauge. At opposing sides of the uppermost portion of the central elongated member are second IPS connections. Connected to these IPS connections is a compression 90° elbow. At the other end of the compression 90° elbow is a third IPS connection. On the left section of the lowermost portion of the central elongated member is a female garden hose fitting. On the right side of the lowermost portion of the central elongated member is a pressure bleed valve (shrader valve) controlled by a control knob at its base. Two flexible detachable hoses are provided each having a female hose connection at one end and a nut at the remaining end. The nut is for attachment to the third ISP connections and the female hose connection is for attachment to the washing machine box hot and cold valves.

When using the present invention, the flexible hoses are first connected to the third ISP connections. The female hose connections of these flexible hoses are then connected to the hot and cold valves provided at the washing machine box. A user checks to make sure all connections are tight and that any openings in the hot and cold water lines are capped and/or any valves in the system are tightly closed. The hot and cold valves at the washing machine box are opened.

For air testing, the control knob is turned clockwise to a closed position to close the water inlet on the present invention. An air source is provided to the shrader valve. The system is then pressurized from the air source to no more than 100 PSI. Upon completion of this test, the control knob is turned counterclockwise to release the pressure from the system.

For water testing, a water hose is connected at one end to an external water source and at the other end to the female garden hose fitting. The control knob is then turned counterclockwise to open the water inlet on the present invention. The external water source is then turned on and the system filled to the desired pressure not to exceed 100 PSI. The control knob is then turned clockwise to close the water inlet. The external water source is turned off and the water hose is disconnected from the present invention. In case of a leak in the piping, alternating the closing of the hot and cold valves in the washing machine box will isolate the hot from the cold piping. Single line or static testing can be accomplished by removing one of the flexible hoses and capping one of the third ISP connections.

BRIEF DESCRIPTION OF THE DRAWINGS

FIG. 4 is an exploded side view of the preferred embodiment of the present invention.

FIG. 5 is a side exploded view of the preferred embodiment of the present invention.

DETAILED DESCRIPTION OF THE PREFERRED EMBODIMENT

Figure 1:
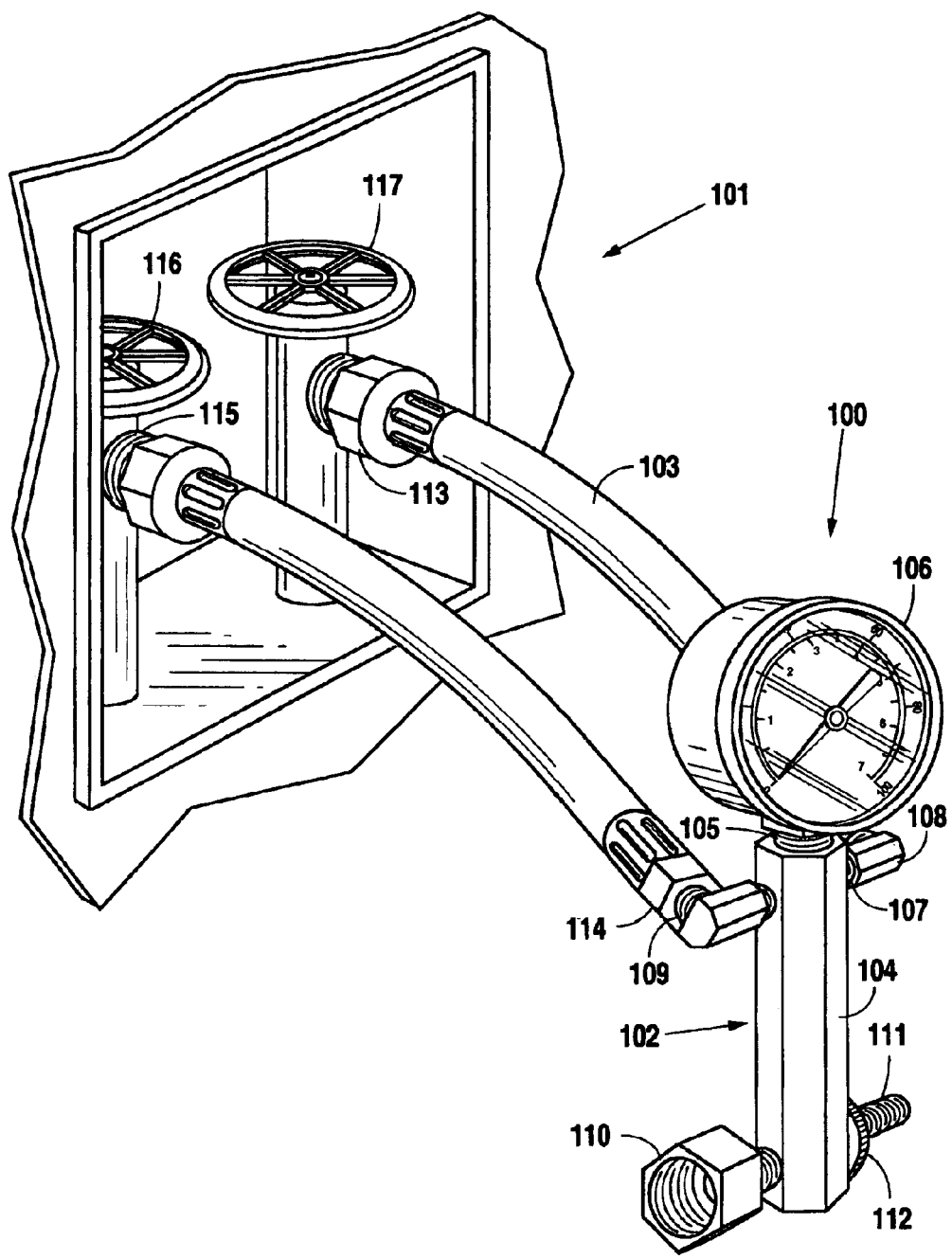
FIG. 1 is a perspective view of the preferred embodiment of the present invention.

FIG. 1 is a perspective view of the preferred embodiment of the present apparatus 100 as it would exist connected to a washing machine box 101. The apparatus 100 has two primary components, a body 102 and a set of flexible detachable hoses 103. The body 102 has a central elongated member 104. At the top most portion of the central elongated member 104 is a first internal pipe swivel (IPS) connection 105. This first internal pipe swivel connection 105 connects to a 100 PSI gauge 106. At opposing sides of the uppermost portion of the central elongated member 104 are second IPS connections 107. Connected to these second IPS connections 107 is a compression 90 degree elbow 108. At the backside of the compression 90 degree elbow 108 is a third IPS connection 109.

On the left section of the lowermost portion of the central elongated member 104 is a female garden hose fitting 110. On the right side of the lower most portion of the central elongated member 104 is a pressure bleed valve (shrader valve) 111 controlled by a control knob 112 at its base. Two flexible detachable hoses 103 are provided each having a female hose connection 113 at one end and a nut 114 at the remaining end. The nut 114 is for attachment to the third ISP connections 109 and the female hose connection 113 is for attachment to the washing machine box 101 at the threaded hose connections 115 for the hot valve 116 and cold valve 117.

Figures 2, 3:
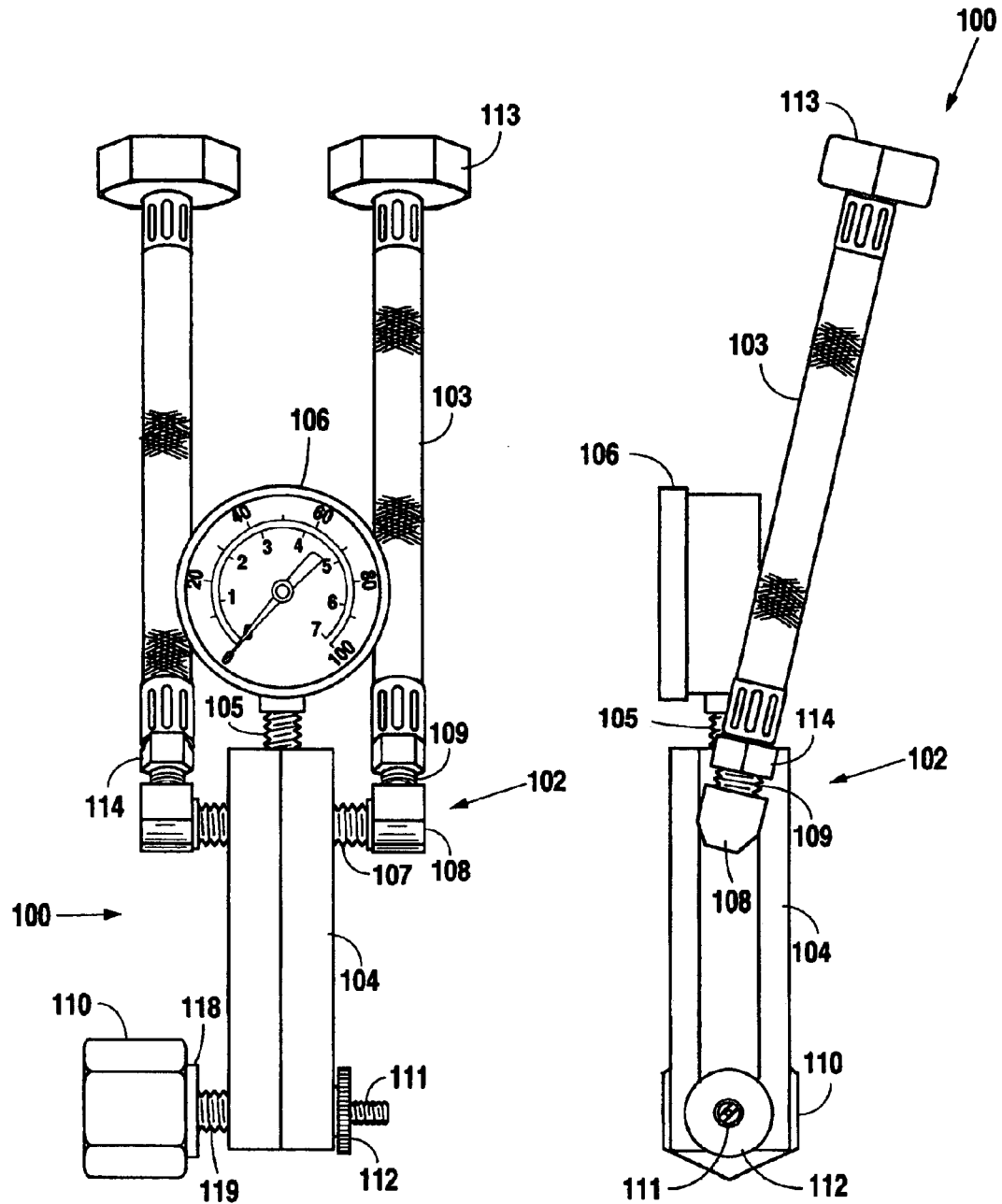
FIG. 2 is a front view of the preferred embodiment of the present invention assembled.
FIG. 3 is a side view of the preferred embodiment of the present invention.

In FIG. 2 a front view of the preferred embodiment of the present apparatus 100 is shown. The apparatus 100 has the body 102 and the set of flexible detachable hoses 103. The body has the central elongated member 104 to which is attached the first internal pipe swivel connection 105, two second IPS connections 107, female garden hose fitting 110 and pressure bleed valve 111 with control knob 112. The first internal pipe swivel connection 105 connects to the 100 PSI gauge 106. The second IPS connections connect to the compression 90 degree elbow 108 which connects to the third IPS connection 109. The female garden hose fitting 110 rests on a base 118 connected to a threaded portion 119. The threaded portion 119 in turn connects to the central elongated member 104. Again the two flexible detachable hoses 103 are shown each having the female hose connection 113 at one end and the nut 114 at the remaining end. The nut 114 is for attachment to the third ISP connections 109.

FIG. 3 is a side view of the preferred embodiment of the present apparatus 100. The apparatus 100 has body 102 and set of flexible detachable hoses 103. The body 102 has central elongated member 104. At the top most portion of the central elongated member 104 is first internal pipe swivel (IPS) connection 105 to which is connected the 100 PSI gauge 106. At the uppermost portion of the central elongated member 104 are second IPS connections 107 (See FIG. 2) to which are connected compression 90 degree elbows 108. Connected to the compression 90 degree elbow 108 is the third IPS connection 109. The compression 90 degree elbows 108 and the third ISP connections 109 are angled from the central line of the central elongated member 104 to allow the flexible detachable hoses 103 to extend behind the central elongated member 104.

The female garden hose fitting 110 is provided. The pressure bleed valve (shrader valve) 111 is shown and is controlled by the control knob 112 at its base. The flexible detachable hose 103 has female hose connection 113 at one end and nut 114 at the remaining end. The nut 114 being connected to the third ISP connections 109 and the female hose connection 113 being for attachment to the washing machine box 101 (See FIG. 1).

In FIG. 4 an exploded view of the preferred embodiment of the present apparatus 100 is shown. Eight main pieces are provided. Central elongated member 104 is shown which provides connection 120 to first internal pipe swivel connection 105. First internal pipe swivel connection 105 in turn connects to the 100 PSI gauge 106. Connected by way of connection 121 at the sides of the upper most portion of the central elongated member 104 are second IPS connections 107 to which are connected compression 90 degree elbows 108. The compression 90 degree elbows 108 are connected to third ISP connections 109.

On the left section of the lowermost portion of the central elongated member 104 is female garden hose fitting 110. The female garden hose fitting 110 rests on base 118 connected to threaded portion 119. The threaded portion 119 in turn connects to the central elongated member 104 by way of connection 122. On the right side of the lower most portion of the central elongated member 104 is pressure bleed valve (shrader valve) 111 controlled by control knob 112 at its base. Pressure bleed valve 111 connects to central elongated member 104 by way of connector 123 contained within connection 124. The flexible detachable hoses 103 are provided each having female hose connection 113 and nut 114. Nut 114 is for connection to third ISP connections 109.

FIG. 5 is a side exploded view of the preferred embodiment of the present apparatus 100. Central elongated member 104 is shown with compression 90 degree elbows 108 and third ISP connections 109. One end of first internal pipe swivel connection 105 is provided for connection into central elongated member 104. The remaining end of first internal pipe swivel connection 105 connects to 100 PSI gauge 106. At the lowermost portion of central elongated member 104 is female garden hose fitting 110. Within the inner portion of female garden hose fitting 110 is screen 125.

When using the present apparatus 100, the flexible detachable hoses 103 are first connected to the third ISP connections 109. The female hose connections 113 of these flexible hoses 103 are then connected to the hot valve 116 and cold valve 117 provided at the washing machine box 101. A user checks to make sure all connections are tight and that all openings in the hot and cold water lines (not shown) are capped and/or any valves in the system are tightly closed. The hot valve 116 and cold valve 117 at the washing machine box 101 are then opened.

For air testing, the control knob 112 is turned clockwise to a closed position to close the water inlet being the pressure bleed valve (shrader valve) 111 on the present apparatus 100. An air source (not shown) is provided to the pressure bleed valve (shrader valve) 111. The system is then pressurized from the air source (not shown) to no more than 100 PSI as determined by the 100 PSI gauge 106. Upon completion of the test, the control knob 112 is turned counterclockwise to release the pressure from the system.

For water testing, a water hose (not shown) is connected at one end to an external water source (not shown) and at the other end to the female garden hose fitting 110. The control knob 112 is then turned counterclockwise to open the water inlet being the pressure bleed valve (shrader valve) 111 on the present apparatus 100. shown) is then turned on and the system is filled with water to the desired pressure not to exceed 100 PSI as determined by the 100 PSI gauge 106. The control knob 112 is then turned clockwise to close the water inlet being the pressure bleed valve (shrader valve) 111. The external water source (not shown) is then turned off and the water hose (not shown) is disconnected from the present apparatus 100. In case of a leak in the piping, alternating the hot valve 116 and the cold valve 117 in the washing machine box 101 will isolate the hot from cold piping. Single line or static testing can be accomplished by removing one of the flexible hoses 103 and capping one of the third ISP connections 109.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An apparatus for testing domestic water or air piping systems comprising:

a central elongated member;

a first internal pipe swivel connection connected to said central elongated member;

a pressure gauge connected at the top of said central elongated member, wherein said pressure gauge connects to said first internal pipe swivel connection;

at least one flexible hose connected to and extending behind said central elongated member and said pressure gauge;

a female garden hose fitting connected to bottom of said central elongated member;

a pressure bleed valve connected to bottom of said central elongated member;

at least one female hose connection connected to said flexible hose for connection to a washing machine box; and a second internal pipe swivel connection connected to said central elongated member.

2. The apparatus for testing domestic water or air piping systems of claim 1 further comprising a compression 90 degree elbow connected to said second internal pipe swivel connection.

3. The apparatus for testing domestic water or air piping systems of claim 2 further comprising a third internal pipe swivel connection connected to said compression 90 degree elbow.

4. The apparatus for testing domestic water or air piping systems of claim 3 wherein said at least one flexible hose is connected to said third internal pipe swivel connection.

5. The apparatus for testing domestic water or air piping systems of claim 4 further comprising a threaded portion connected to said central elongated member.

6. The apparatus for testing domestic water or air piping systems of claim 5 wherein said female garden hose fitting connects to said threaded portion.

7. The apparatus for testing domestic water or air piping systems of claim 6 further comprising a control knob connected to said central elongated member and adjacent to said pressure bleed valve.

8. An apparatus for testing domestic water or air piping systems comprising:

a central elongated member having a threaded portion;

a pressure gauge connected at the top of said central elongated member;

at least one flexible hose connected to and extending behind said central elongated member and said pressure gauge;

a female garden hose fitting connected to bottom of said central elongated member whereby said female garden hose fitting connects to said threaded portion;

a pressure bleed valve connected to bottom of said central elongated member; and at least one female hose connection connected to said flexible hose for connection to a washing machine box.

* * * * *